(12) United States Patent
Perez Garcia et al.

(10) Patent No.: US 10,173,631 B2
(45) Date of Patent: Jan. 8, 2019

(54) THORAX OCCUPANT PROTECTION DEVICE AND METHOD OF PROTECTING THE THORAX OF A VEHICLE OCCUPANT IN SIDE IMPACTS

(71) Applicant: Dalphi Metal Espana, S.A., Vigo (ES)

(72) Inventors: Azucena Perez Garcia, Avila (ES); Maria Crespo Vizan, Valladolid (ES); Oscar Ugarte Alba, Valladolid (ES); Luis Jose Duarte De Arez, Valladolid (ES)

(73) Assignee: Dalphi Metal Espana S.A. (ES)

( * ) Notice: Subject to any disclaimer, the term of this patent is extended or adjusted under 35 U.S.C. 154(b) by 0 days.

(21) Appl. No.: 15/117,751

(22) PCT Filed: Feb. 19, 2015

(86) PCT No.: PCT/EP2015/000367
§ 371 (c)(1),
(2) Date: Aug. 10, 2016

(87) PCT Pub. No.: WO2015/124299
PCT Pub. Date: Aug. 27, 2015

(65) Prior Publication Data
US 2016/0355155 A1    Dec. 8, 2016

(30) Foreign Application Priority Data
Feb. 20, 2014    (DE) .................... 20 2014 001 513 U

(51) Int. Cl.
*B60R 21/231* (2011.01)
*B60R 21/233* (2006.01)
*B60R 21/00* (2006.01)

(52) U.S. Cl.
CPC ...... *B60R 21/23138* (2013.01); *B60R 21/233* (2013.01); *B60R 2021/0041* (2013.01); *B60R 2021/23316* (2013.01)

(58) Field of Classification Search
CPC ............ B60R 21/23138; B60R 21/233; B60R 2021/23316; B60R 2021/0041
See application file for complete search history.

(56) References Cited

U.S. PATENT DOCUMENTS 7,641,228 B2 * 1/2010 Mansson ................. B60R 21/21
280/730.2
8,414,018 B2 * 4/2013 Choi .................. B60R 21/23138
280/729

(Continued)

FOREIGN PATENT DOCUMENTS

DE    102010016716 A1 *  5/2011   ............. B60R 21/20
EP    2481642    8/2012

(Continued)

*Primary Examiner* — Paul N Dickson
*Assistant Examiner* — Joselynn Y Sliteris
(74) *Attorney, Agent, or Firm* — Tarolli, Sundheim, Covell & Tummino LLP

(57) ABSTRACT

The present invention relates to a thorax occupant protection device (10) comprising a side airbag (12), especially for being mounted in a door or the seat of an automotive vehicle, which in the inflated and mounted state of the side airbag (12) at its upper end includes at least one occupant-side inflatable inner wing (22) for shifting the occupant's adjacent arm forward and at least one door-side inflatable outer wing (24) for protecting the thorax, wherein the inner and outer wings (22, 24) in the inflated state are juxtaposed at least in portions and are separated from each other by an indentation (26) of the airbag wall (13) extending from the upper end in the downward direction. The present invention further relates to a method of protecting the thorax of a vehicle occupant in the event of a side impact.

16 Claims, 12 Drawing Sheets

(56) References Cited

U.S. PATENT DOCUMENTS

Figure 1:
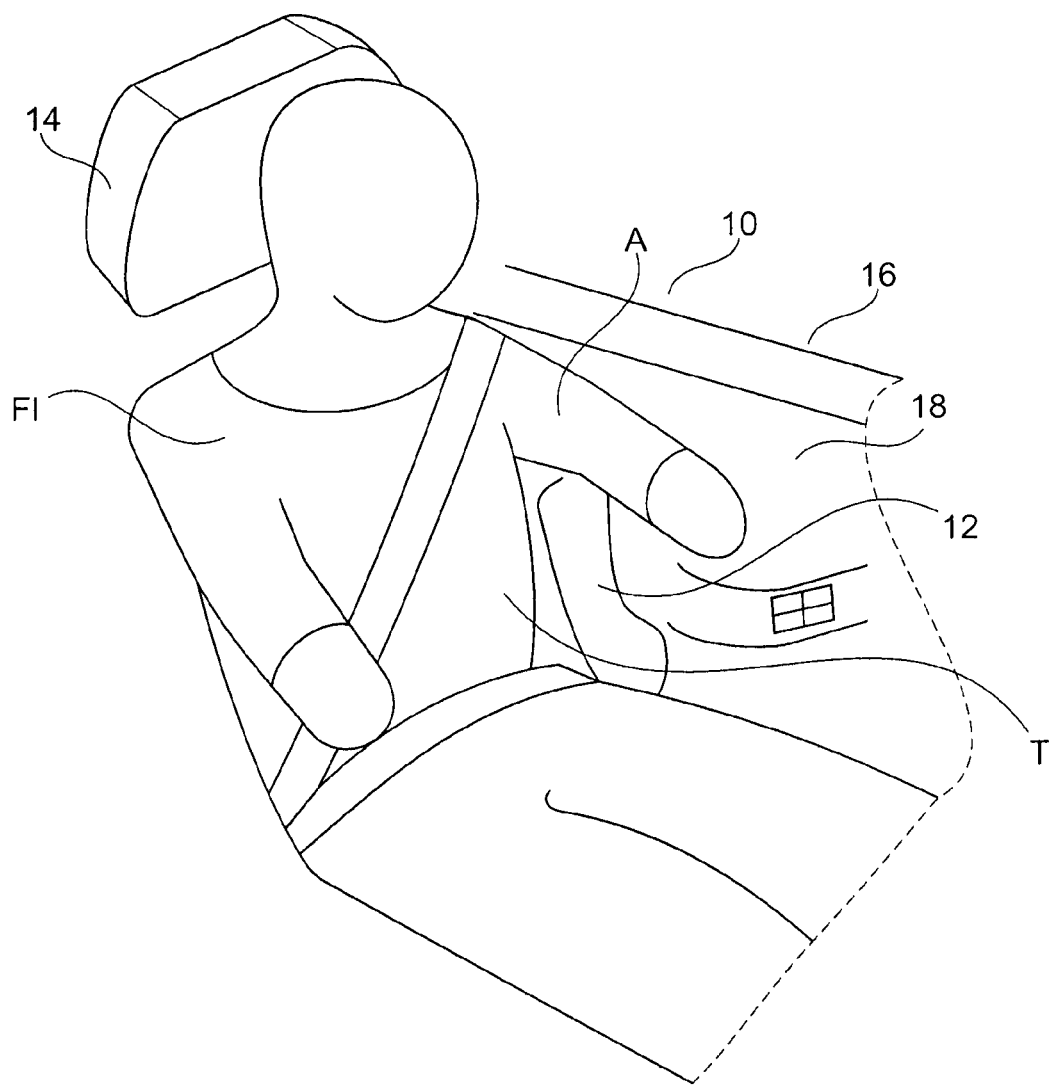

| | | | | |
|---|---|---|---|---|
| 8,616,579 B2* | 12/2013 | Suzuki | ............. | B60R 21/23138 |
| | | | | 280/729 |
| 9,873,400 B2* | 1/2018 | Scherr | ............... | B60R 21/23138 |
| 2007/0216142 A1 | 9/2007 | Honda et al. | | |
| 2017/0174170 A1* | 6/2017 | Aranzulla | ............ | A42B 3/0486 |

FOREIGN PATENT DOCUMENTS

| | | |
|---|---|---|
| JP | 2010132072 | 8/2010 |
| JP | 2013154786 | 8/2013 |

\* cited by examiner

THORAX OCCUPANT PROTECTION DEVICE AND METHOD OF PROTECTING THE THORAX OF A VEHICLE OCCUPANT IN SIDE IMPACTS

RELATED APPLICATION

This application corresponds to PCT/EP2015/000367, filed Feb. 19, 2015, which claims the benefit of German Application No. 20 2014 001 513.9, filed Feb. 20, 2014, the subject matter of which is incorporated herein by reference in their entireties.

The present invention relates to a thorax occupant protection device and to a method of protecting the thorax of a vehicle occupant in a side impact.

Thorax occupant protection devices as well as methods of protecting the thorax of a vehicle occupant in a side impact are known already from prior art.

From U.S. Pat. No. 7,828,326 B2 already an airbag is known that causes constriction of the airbag by means of a band. However, the occupant protection device described in U.S. Pat. No. 7,828,326 B2 does not deal with the problem of how the load of the occupant's thorax can be reduced.

To achieve good or very good evaluations, the new evaluation criteria of the NCAP crash test require a smaller load of the thorax in the event of a side impact compared to the previously valid evaluation criteria.

The previously known solutions have to be further improved so as to achieve good or very good evaluations in accordance with. the new criteria of the NCAP crash test.

Therefore, it is the object of the present invention to further develop a thorax occupant protection device and a method of protecting the thorax of a vehicle occupant in the event of a side impact in an advantageous manner, especially to the effect that the load of the thorax in the event of a side impact can be reduced.

According to, the invention, this object is achieved by a thorax occupant protection device comprising the features of claim 1. Accordingly, a thorax occupant protection device includes a side airbag, especially for being mounted in a door or the seat of an automotive vehicle, which in the inflated and mounted state of the Side airbag at its upper end has at least one occupant-side inflatable inner wing for shifting the occupant's adjacent arm forward and at least one door-side inflatable outer wing for the protection of the thorax, wherein in the inflated state the inner and outer wings are juxtaposed at least in portions and are separated from each other by an indentation Of the airbag wall extending from the upper end in the downward direction.

In this way it is advantageously achieved that in the event of a side impact the side airbag of the thorax occupant protection device inflates so that the occupant's arm located between the door and the thorax and thus being adjacent to the side airbag is urged and lifted, respectively, out of this region. Thus the load of the thorax is definitely reduced and the latter now can impact directly on the side airbag. Furthermore, the inflating side airbag is prevented from urging the arm located between the door and the occupant's thorax against the thorax. Especially the occupant's upper rib region is thus no longer covered by the arm and hence can freely impact on the airbag.

Furthermore it can be provided that the indentation, measured from the upper end of the side airbag, has a minimum depth of 100 mm. This results in the advantage that the inner wing is adapted to provide proper support to the adjacent arm so as to shift the same forward.

Moreover, it is imaginable that the inner wing and the outer wing are configured to be symmetrical to each other. This facilitates uniform and simultaneous inflation of the inner wing and the outer wing.

In another possible embodiment, in the inflated and mounted state of the side airbag the outer wing projects above the inner wing. In this way the outer wing is adapted to support the shoulder of the vehicle occupant facing the side airbag.

It is further possible that in the inflated and mounted state of the side airbag related to the cross-section viewed in the travel direction of the vehicle the side airbag is Y shaped, wherein the wings form the two upwards projecting legs of the Y. This shaping ensures that beneath the wings a stable retention is guaranteed in the Zone of the lower web. The Y shape is not intended to mean that the wings extend obliquely apart from each other but that the airbag is divided into the wings from a lower portion to the top.

Moreover, it can be provided that the chamber of the inner wing and the chamber of the outer wing are transformed into at least one preferably common central lower chamber, especially wherein the width of the lower chamber to be determined in the transverse vehicle direction corresponds to the width of the side airbag in the area of the wings so that the airbag retains the major part of the thorax Via the stable lower chamber. Finally this configuration also supports the objective to inflate the inner wing and the outer wing comparatively quickly so as to urge the occupant's adjacent arm out of the zone between the door and the thorax, because the gas can flow from the lower chamber without deflection into the wings.

In a further advantageous embodiment the side airbag includes a fastening portion and inflating portion which is provided in the area of the lower chamber and in the mounted and inflated state the wings are projecting freely upwards. In this way the side airbag inflates from the lower chamber toward the inner wing and the outer wing and, consequently, exactly in the direction in which the adjacent arm is to be urged out of the zone between the door and the thorax.

In addition, it can be provided that the facing airbag wall portions of the wings contact each other in the inflated state. In this way the outer wing can support the inner wing with the arm being shifted forward and can further dampen the occupant's impact. Hence this reduces the occupant's stress.

Moreover it is imaginable that the height of the side airbag in the inflated and mounted state of the side airbag viewed in the travel direction of the vehicle is larger than its width. This has an advantageous influence on the inflation behavior to the effect that the airbag inflates more quickly to the top and thereby can urge and lift, respectively, the adjacent arm comparatively quickly out of the zone between the door and the thorax.

In another embodiment it may be provided that the indentation in the inflated and mounted state of the side airbag extends substantially in parallel to the door of the vehicle and/or that the inner wing and the outer wing in the inflated and mounted state of the side airbag extend substantially in parallel to the door of the vehicle.

Further, the indentation can be formed exclusively by folding in the airbag wall itself. Moreover it is possible that no inner wall or tether acts also on the bottom of the indentation, i.e. the constriction is formed without tethers or constriction bands and only by an appropriate cut and sewing of the edges.

The airbag can have a one-piece cut. This facilitates the manufacture of the airbag and reduces the manufacturing costs.

For sewing up the edges outer folds extending toward each other in V-shape and forming the upper edges of the wings can be provided. This allows for a simple configuration of the inner wing and the outer wing.

Substantially centrally between the outer folds an inner fold forming the bottom of the indentation can be provided. The inner fold can equally be V-shaped.

Furthermore, it can be provided that the upper end of the inner wing is provided at least in portions in the inflated and mounted state of the side airbag in the region of the armpit of an upright seated dummy located on the associated vehicle seat, preferably a 50 percent dummy. This allows for very good support of the occupant's adjacent arm and shoulder. Further, the entire upper arm up to the armpit is supported during raising.

In another embodiment the upper contour of the inner wing in the inflated and mounted state of the side airbag can extend in the side view in the direction of the vehicle front obliquely downwards, especially including an angle between about 5° and 25° with the horizontal line. It is achieved by this shaping that the arm is urged and lifted, resp., only to the necessary extent so that it is no longer provided between the door and the occupant's thorax.

It can be provided in another embodiment that the inner wing has a width of 50 to 150 mm at least in portions in the inflated and mounted state of the side airbag related to the cross-section viewed in the travel direction of the vehicle so that a width sufficient to support the occupant's arm and to urge the same away from the zone between the door and the occupant's thorax is imparted to the inner wing.

Moreover, the present invention relates to a method of protecting the thorax of a vehicle occupant in the event of a side impact. According to the invention, the method comprises at least the following steps of:

providing a side airbag having an inflatable lower chamber and an inflatable upwardly projecting inner wing extending from the lower chamber as well as an inflatable upwardly projecting outer wing extending from the lower chamber, inflating the lower chamber, raising the occupant's arm by inflating the inner wing and inflating the outer wing, wherein the gas passage in the side airbag is configured so that the side airbag is inflated starting from the bottom.

In connection with the method, advantageously a thorax occupant protection device according to the invention can be used.

Figure 2:
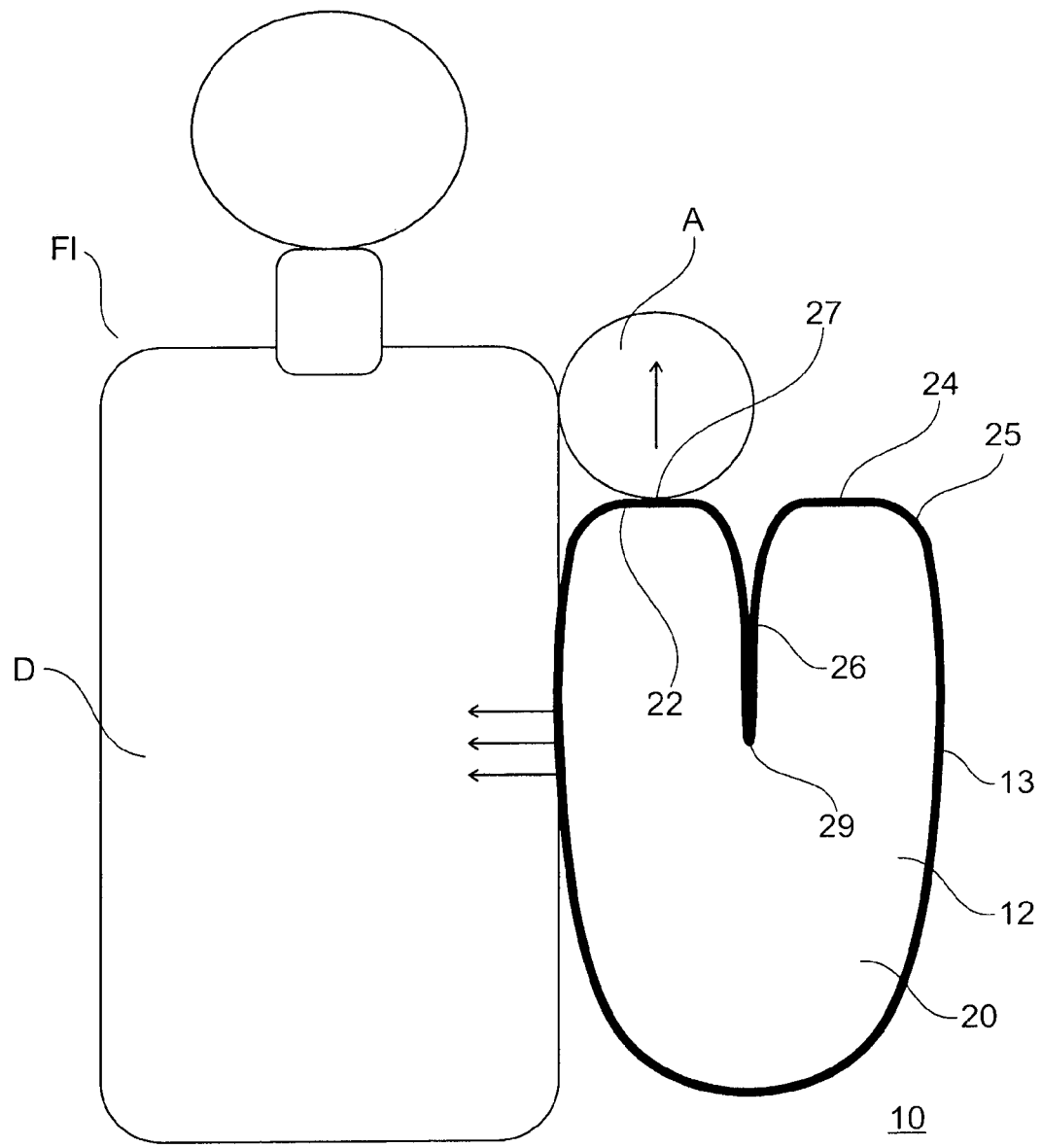
Figure 3:
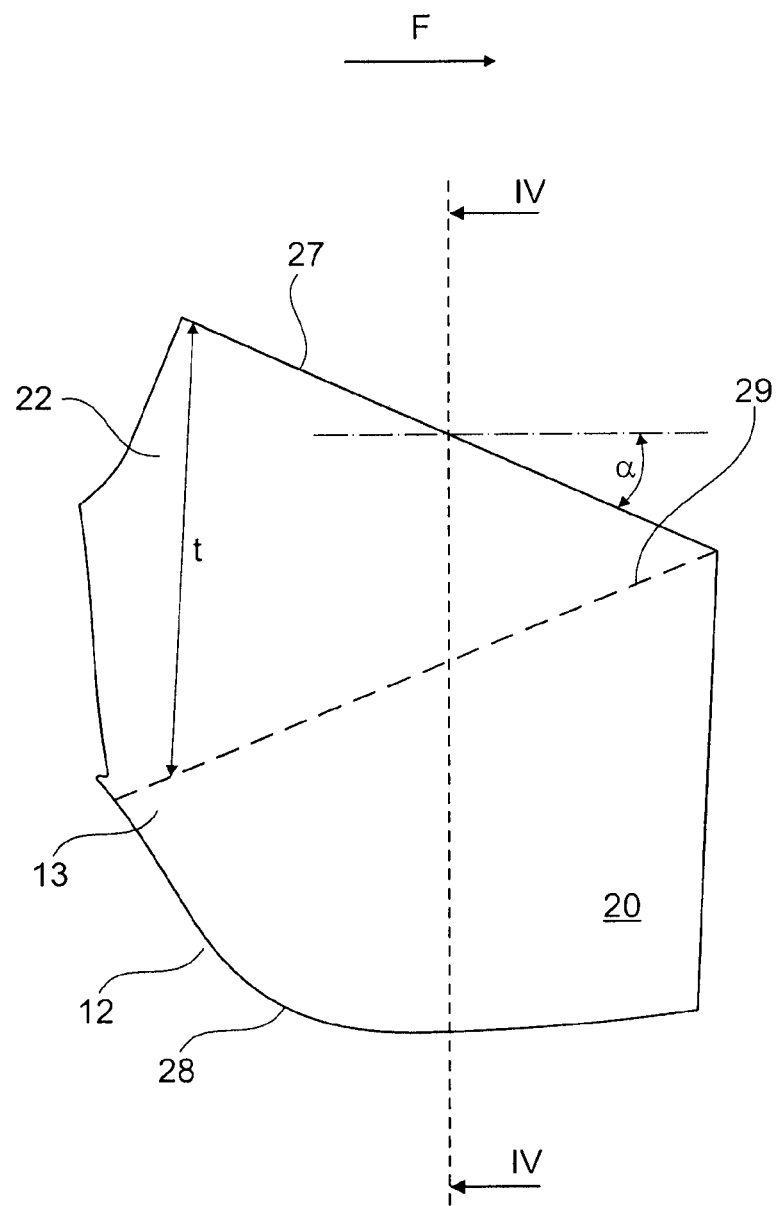
Figure 4:
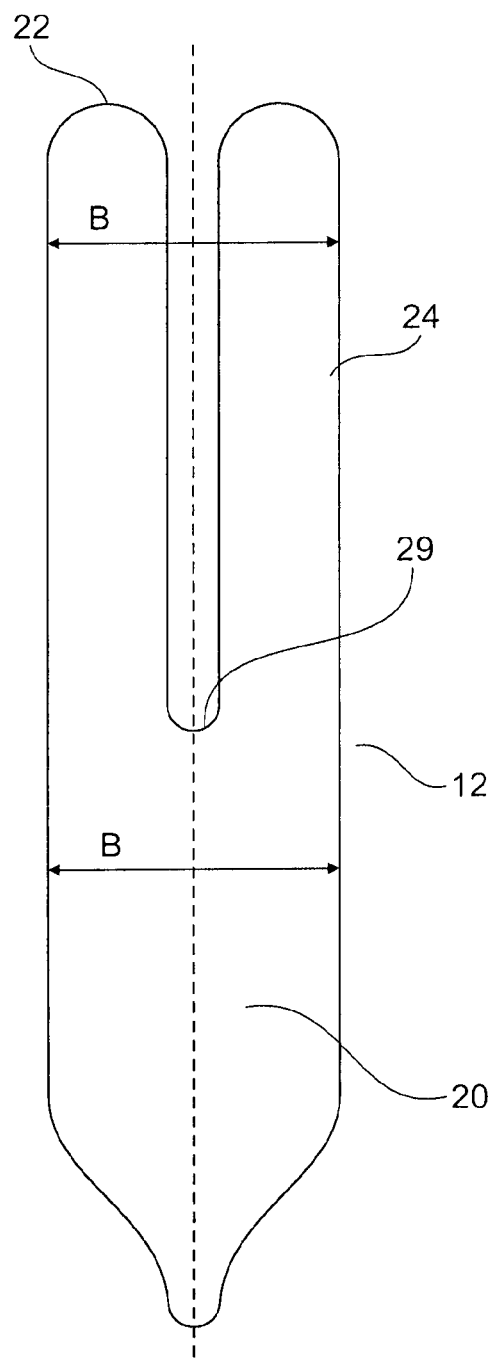
Figure 5:
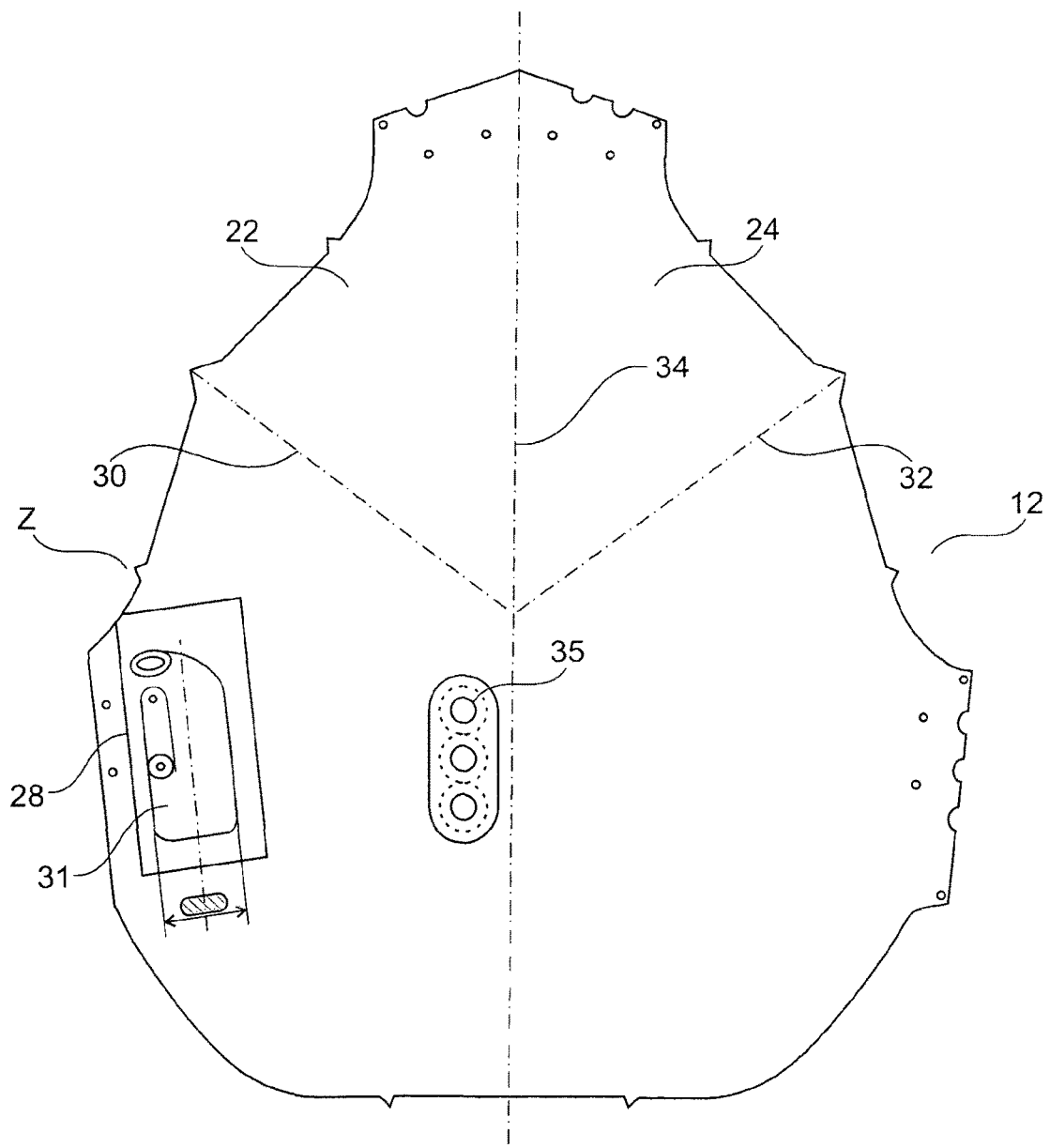
Figure 6:
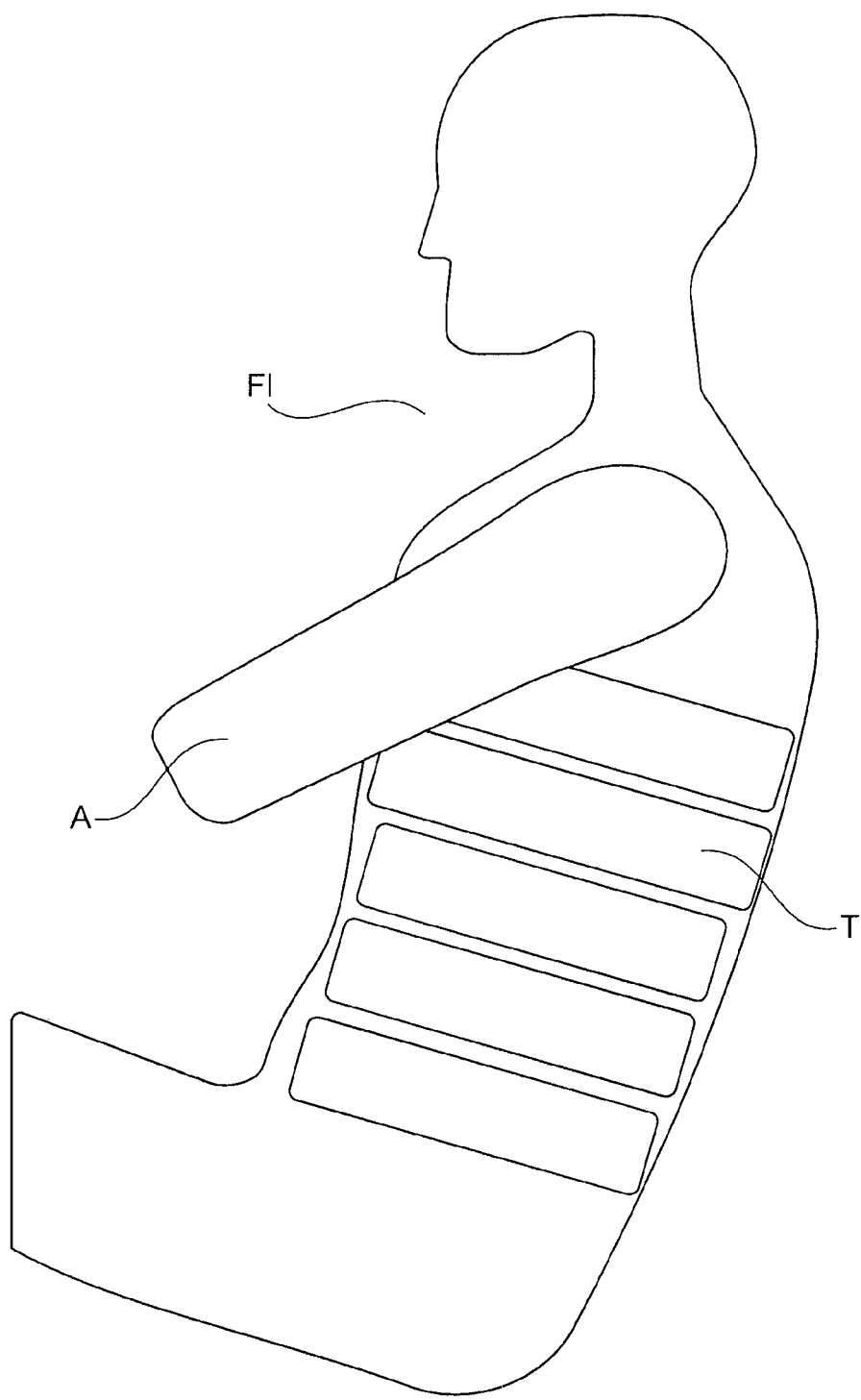
Figure 7:
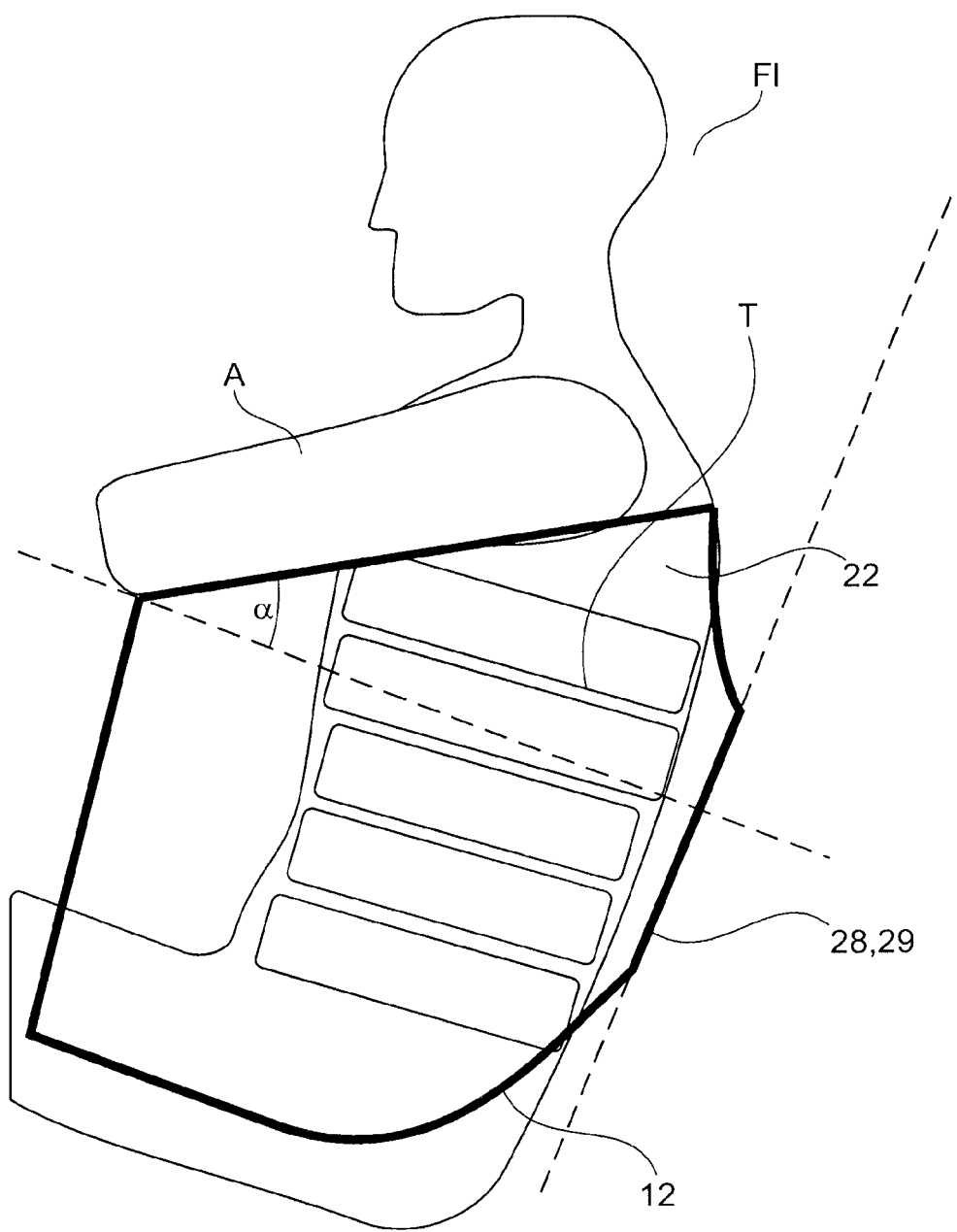
Figure 8:
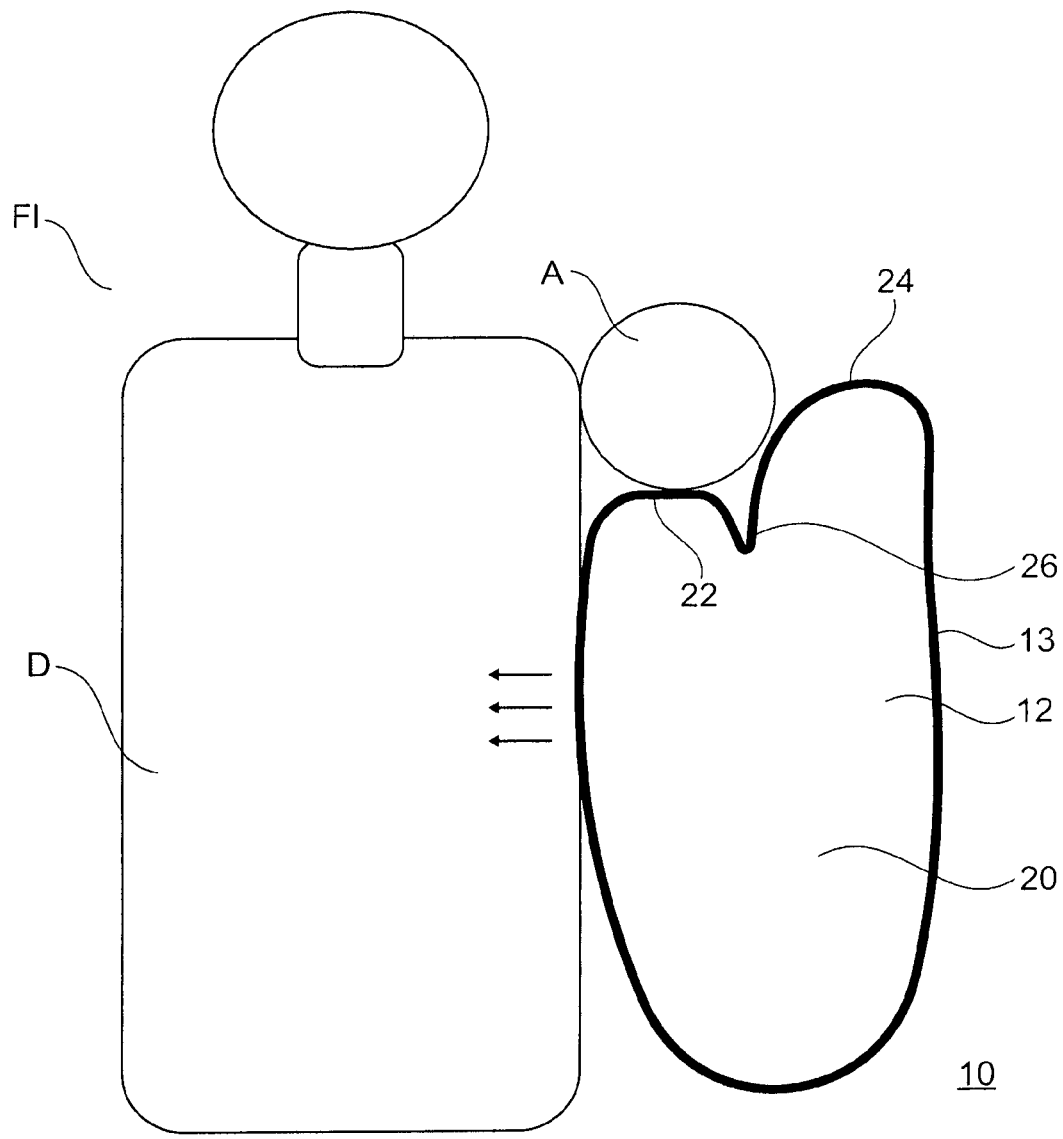
Figure 9:
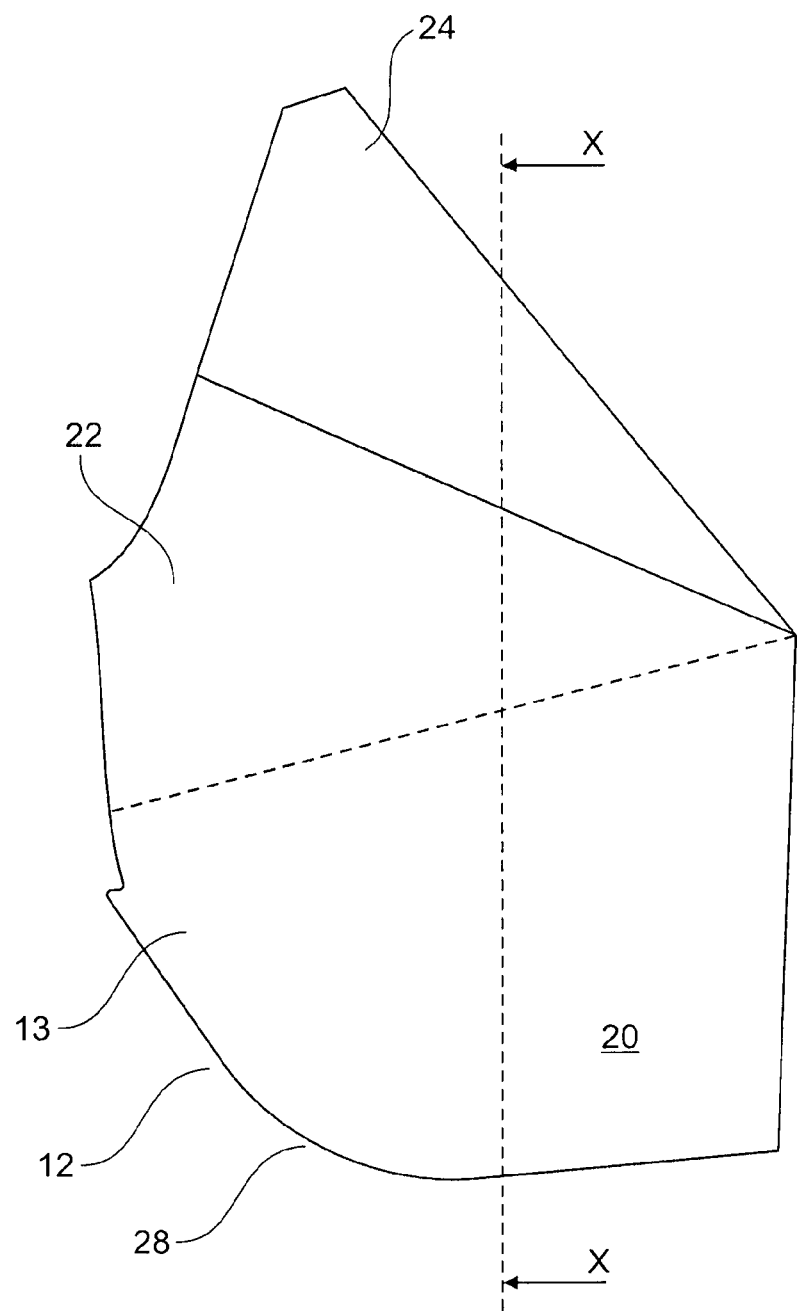
Figure 10:
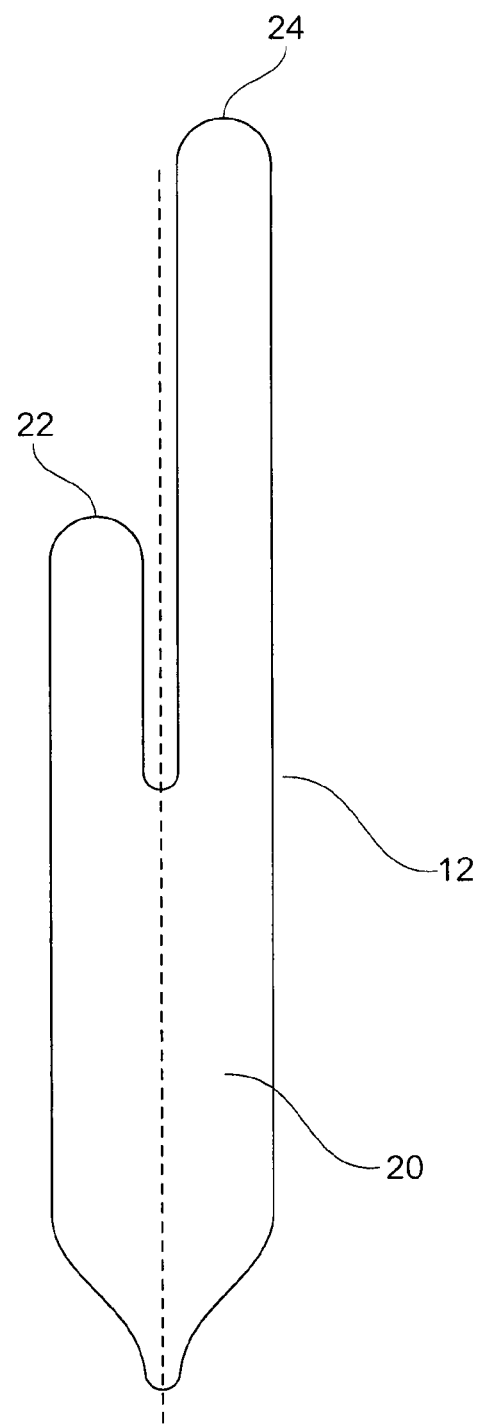
Figure 11:
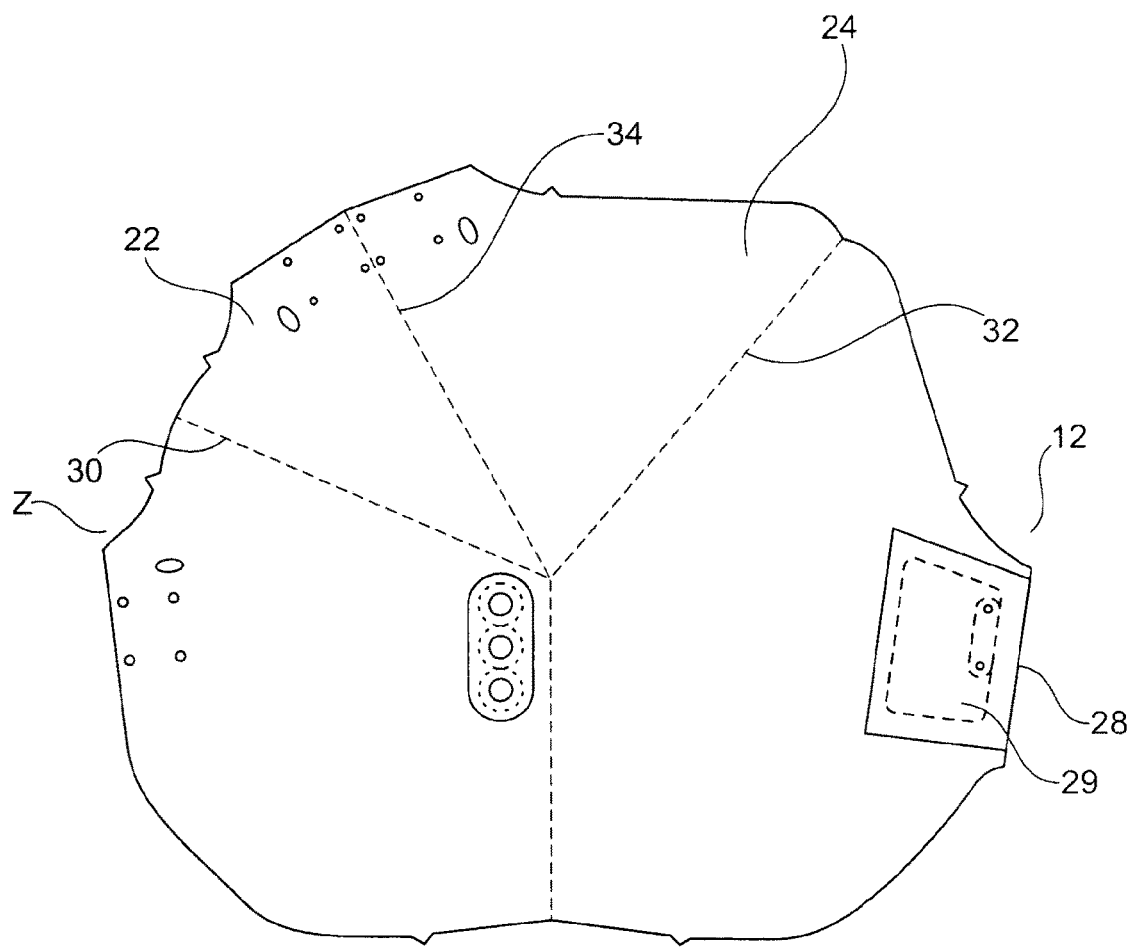
Figure 12:
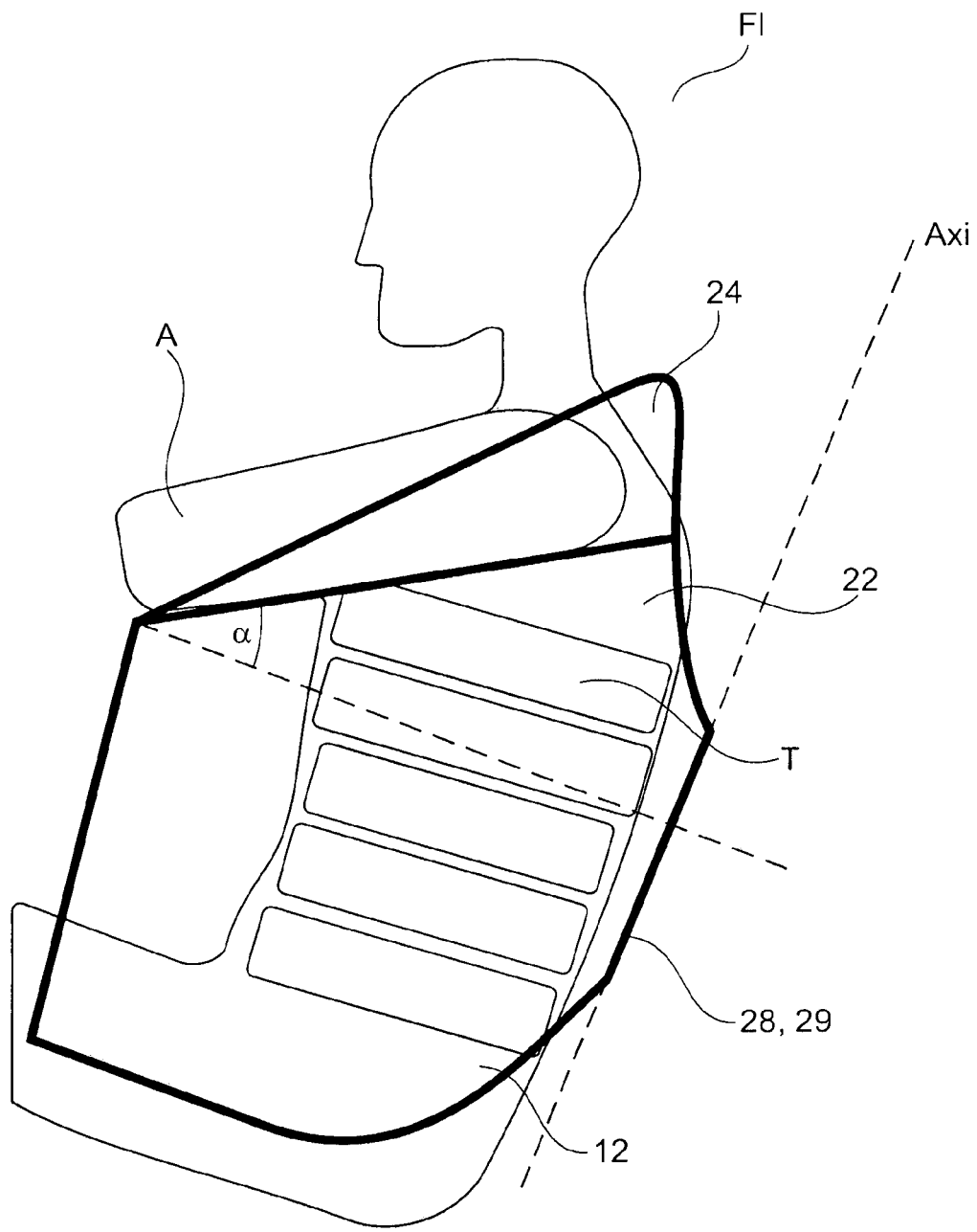

Further features and advantages of the invention are resulting from the following description and from the following drawings which are referred to. The drawings show in:

FIG. 1 a perspective view of an embodiment of a thorax occupant protection device according to the invention in connection with a method of protecting the thorax of a vehicle occupant according to the invention in the event of a side impact;

FIG. 2 a schematic view of the vehicle occupant and the inflated and mounted side airbag of a first embodiment of a thorax occupant protection device according to the invention;

FIG. 3 a schematic side view from the vehicle interior with a view to the outside perpendicularly to the travel direction onto the side airbag according to FIG. 2;

FIG. 4 a section across the side airbag along the line IV-IV in FIG. 3;

FIG. 5 a top view onto the cut of the side airbag according to the embodiment from FIGS. 1 to 4;

FIG. 6 a side view of the vehicle occupant in the direction of the vehicle interior without inflated side airbag;

FIG. 7 a side view of the vehicle occupant in the direction of the vehicle interior with the inflated side airbag of the thorax occupant protection device according to the invention;

FIG. 8 a schematic view of the vehicle occupant and the inflated and mounted side airbag of a second embodiment of a thorax occupant protection device according to the invention;

FIG. 9 a schematic side view from the vehicle interior with a view to the outside perpendicularly to the travel direction onto the side airbag according to FIG. 8;

FIG. 10 a section across the side airbag along the line X-X in FIG. 9;

FIG. 11 a top view onto the cut of the side airbag according to the embodiment from FIGS. 8 to 10; and FIG. 12 a side view of the vehicle occupant in the direction of the vehicle interior with inflated side airbag.

FIG. 1 shows a perspective view of an embodiment of a thorax occupant protection device 10 according to the invention.

The thorax occupant protection device 10 includes a side airbag 12 in this case mounted in the seat 14 of a vehicle 16. The side airbag 12 can as well be mounted in the door 18 of the vehicle 16.

The side airbag 12 is shown in FIG. 1 in the mounted and inflated state and is provided between the door 18, the thorax region T and the arm A of the vehicle occupant Fl.

FIG. 2 shows a schematic view of the vehicle occupant Fl and the inflated and mounted side airbag 12 of a first embodiment of a thorax occupant protection device 10 according to the invention.

In the inflated and mounted state related to the cross-section viewed in the travel direction of the vehicle, the side airbag 12 has a roughly simplified Y-Shaped configuration.

This configuration is resulting from the arrangement of a central chamber 20 provided in the lower zone from which an inner wing 22 and an outer wing 24 are rising. The inner wing 22 and the outer wing 24 form the upwards projecting legs of the Y shape.

The inner and outer wings 22 and 24, resp., are characterized by respective separate inflatable chambers which are completely open toward the lower chamber 20.

It may be provided that the width Of the lower chamber 20 to be determined in the transverse vehicle direction corresponds to the Width B of the side airbag 12 in the area of the wings 22, 24 (cf. FIG. 4).

In the inflated and mounted state of the side airbag 12 viewed in the travel direction of the vehicle, the height of the side airbag 12 is larger than its width.

Between the inner wing 22 and the outer wing 24 an indentation 26 is provided which is formed by folding the airbag wall into the interior of the airbag.

As is evident from FIG. 2, the inner and outer wings 22, 24 are juxtaposed in the inflated state at least in portions and are separated from each other by the indentation 26 of the airbag wall 13 extending from the upper end in the downward direction. The airbag wall portions of the wings 22, 24 facing each other contact each other in the inflated state.

The indentation 26 has a depth of at least 100 mm, measured from the upper end 25 of the side airbag 12 (i.e. the higher one of the two ends of the wings 22, 24). The maximum depth t is marked in FIG. 2.

The indentation 26 extends, in the inflated and mounted state of the side airbag 12, substantially in parallel to the door of the vehicle.

Moreover the inner wing 22 and the outer wing 24 extend, in the inflated and mounted state of the side airbag 12, substantially in parallel to the door of the vehicle.

The inner wing 22 and the outer wing 24 are formed to be symmetrically to each other.

In the portion shown in FIG. 2 in the inflated and mounted state of the side airbag 12 related to the cross-section viewed in the travel direction of the vehicle the inner wing 22 preferably has a width of about 100 mm. Said width may range from 50 to 150 mm and offers sufficient bearing face for the occupant's upper arm.

The upper end 27 of the inner wing 22 is provided at least in portions in the inflated and mounted state of the side airbag 12 in the area of the armpit of an upright seated dummy D located on the associated vehicle seat (cf. FIG. 2 and FIG. 7). In FIG. 2 the dummy D is a 50 percent dummy.

The indentation 26 is formed, as afore-stated, exclusively by folding in the airbag wall 13 itself. Especially at the bottom 29 of the indentation 26 no inner airbag Wall is provided, nor is provided any tether or the like for constricting the airbag 12 and thereby forming the indentation (cf. FIG. 4).

In FIG. 3 a schematic side view onto the side airbag 12 is illustrated. FIG. 3 shows the side airbag 12 from the interior of the vehicle with a view to the outside perpendicularly to the travel direction F.

The side airbag 12 has a fastening and inflating portion 28 including an inflating mouth 31 provided in the area of the lower chamber 20 (cf. also FIG. 5).

As is clearly visible from FIGS. 3 and 7, the upper contour of the inner wing 22 in the inflated and mounted state of the side airbag 12 in the lateral view extends obliquely downwards in the travel direction F. Here the contour encloses an angle α of approx. 25° with the horizontal line, viz. related to an exactly vertically positioned seat, if the airbag is installed in the back rest. Said angle a can range from about 5° to 25°, for example.

FIG. 5 shows a possible one-piece cut Z for the side airbag 12 according to FIGS. 1 to 4.

For sewing up the edges, outer folds 30, 32 extending from a center outwardly in V shape are provided which later form the upper edges of the inner wing 22 and the outer wing 24. Moreover, an inner fold 34 forming the bottom 29 of the indentation 26 is provided substantially centrally between the outer folds 30, 32.

Optionally, deflating orifices 35 can be provided e.g. at the front edge of the lower chamber 20.

The function of the thorax occupant protection device 10 comprising a side airbag 12 illustrated in FIGS. 1 to 5 can be described especially in connection with FIGS. 6 and 7:

The inner wing 22 of the side airbag 12 serves for shifting the adjacent arm A of occupant Fl forward in the event of a side impact so as to lift or urge said arm out of the zone between the door and especially the upper thorax area T.

At first the lower chamber 20 is inflated through the inflating mouth 30 in the inflating portion 28 of the side airbag 12.

The gas passage in the side airbag 12 is configured so that the side airbag 12 is inflated starting from the bottom.

By inflating the inner wing 22 the arm of the vehicle occupant is raised by the inner wing 22 and is lifted out of the zone between the thorax and the door. The comparison of FIGS. 6 and 7 illustrates that the arm is raised by the inner wing 22, as FIG. 6 represents the normal arm position. The inner wing 22 contacts at least the occupant's upper arm.

Moreover, the outer wing 24 is inflated which serves for additional damping. Due to the fact that both wings 22, 24 are located between the vehicle occupant Fl and the door, no additional support of the shoulder is required.

The thorax region T thus can impact directly onto the side airbag 12, viz. onto the lower chamber 20 and the wings 22, 24.

FIGS. 8 to 13 illustrate a second embodiment of a thorax occupant protection device 10 according to the invention. This thorax occupant protection device 10 is substantially identical to the embodiment shown in FIGS. 1 to 7 as regards its structure and function.

In the Figures features that are identical or equal in function are marked by the same reference numerals.

Substantially the following differences exist.

The outer wing 24 and the inner wing 22 are not formed to be symmetrical to each other. In this case, the outer wing 24 projects above the inner wing 22 in the inflated and mounted state of the side airbag 12.

As regards the function, hence the difference is resulting that the outer wing 24 is adapted to support the shoulder of the vehicle occupant Fl with its side facing the vehicle interior (cf. FIG. 8).

It is emphasized that the outer wing 24 can also project up to the head, as a matter of course.

The invention claimed is:

1. A thorax occupant protection device (10) comprising: a side airbag (12) for mounting in a door or a seat of an automotive vehicle, which in an inflated and mounted state of the side airbag (12) an upper end (25) of the side airbag (12) includes at least one occupant-side inflatable inner wing (22) configured for shifting an occupant's adjacent arm forward and at least one door-side inflatable outer wing (24) configured for protecting the thorax, wherein the inner and outer wing (22, 24) in the inflated state are juxtaposed at least in portions and are separated from each other by an indentation (26) comprising a fold in a wall (13) of the side airbag (12) extending from the upper end in a downward direction to an unsecured end within an interior of the side airbag (12), wherein in the inflated and mounted state of the side airbag (12) related to a cross-section viewed in a direction of travel of the vehicle, the side airbag (12) is Y-shaped with the wings (22, 24) forming two upwards protruding legs of the Y-shaped side airbag (12) and the outer wing (24) projecting to a position at or above the inner wing (22).

2. The thorax occupant protection device (10) according to claim 1, wherein the indentation (26) has a minimum depth of 100 mm measured from the upper end (25) of the side airbag (12).

3. The thorax occupant protection device (10) according to claim 1, wherein the inner wing (22) and the outer wing (24) are formed to be symmetrical to each other.

4. The thorax occupant protection device (10) according to claim 1, wherein the outer wing (24) projects above the inner wing (22) in the inflated and mounted state of the side airbag (12).

5. The thorax occupant protection device (10) according to claim 1, wherein a chamber of the inner wind (22) and a chamber of the outer wing (24) are transformed into a common central lower chamber (20), wherein a width (B) of the lower chamber (20) to be determined in a transverse vehicle direction corresponds to a width (B) of the side airbag (12) in an area of the wings (22, 24).

6. The thorax occupant protection device (10) according to claim 5, wherein the side airbag (12) has a fastening and inflating portion (28) provided in an area of the lower chamber (20), and in that in the mounted and inflated state the wings (22, 24) project freely upwards.

7. The thorax occupant protection device (10) according to claim 1, wherein portions of the wings (22, 24) defining the fold and extending along the indentation contact each other in the inflated state.

8. The thorax occupant protection device (10) according to claim 1, wherein in the inflated and mounted state of the side airbag (12) viewed in a direction of travel of the vehicle, a height of the side airbag (12) is larger than a width of the side airbag (12).

9. The thorax occupant protection device (10) according to claim 1, wherein in the inflated and mounted state of the side airbag (12) the indentation (26) extends substantially in parallel to the door of the vehicle and/or that in the inflated and mounted state of the side airbag (12) the inner wing (22) and the outer (24) extend substantially in parallel to the door of the vehicle.

10. The thorax occupant protection device (10) according to claim 1, wherein the side airbag (12) has a one-piece cut (Z) including outer folds (30, 32) extending in a V shape towards each other which form upper edges (27) of the inner and outer wings (22, 24) when edges of the one-piece cut (Z) are sewn together, and an inner fold (34) forming a bottom (29) of the indentation (26) is provided substantially centrally between the outer folds (30, 32).

11. The thorax occupant protection device (10) according to claim 1, wherein an upper end (27) of the inner wing (22) is configured to extend in the inflated and mounted state of the side airbag (12) to an area of the armpit of an upright, 50 percent seated dummy located on an associated vehicle seat.

12. The thorax occupant protection device (10) according to claim 1, wherein in the inflated and mounted state of the side airbag (12) in a side view in a direction of travel (F) an upper contour of the inner wing (22) extends obliquely downwards at an angle ($\alpha$) between about 5° and 25° with a horizontal line.

13. A method of protecting the thorax of a vehicle occupant in an event of a side impact comprising the steps of:
providing a side airbag (12) including an inflatable lower chamber (20) an upwards projecting inflatable inner wing (22) extending from the lower chamber (20), and an upwards projecting inflatable outer wing (24) extending from the lower chamber (20),
inflating the lower chamber (20)
inflating the inner wing (22) for raising an occupant's adjacent arm and
inflating the inner wing (24) such that the outer wing (24) projects to a position at or above the inner wing (22) and the side airbag (12) is Y shaped related to a cross-section viewed in a direction of travel of the vehicle with the wings (22, 24) forming two, upwards protruding legs of the Y-shaped side airbag (12), wherein
a gas passage in the side airbag (12) is configured so that inflation fluid enters the side airbag (12) starting from a bottom then flows from the bottom into the inner and outer wings (22, 24).

14. The method according to claim 13, wherein the inner and outer wings are separated by an indentation comprising a fold in a wall of the side airbag extending from an upper end of the side airbag in a downward direction to an unsecured end within an interior of the side airbag.

15. A thorax occupant protection device comprising:
a side airbag for mounting in one of a door and a seat of an automotive vehicle, the side airbag having an upper end including at least one occupant-side inflatable inner wing and at least one door-side inflatable outer wing, the side airbag having a mounted and inflated state in which the side airbag is Y-shaped related to a cross-section viewed in a direction of travel of the vehicle with the inner and outer wings forming two upwards protruding legs of the Y-shaped side airbag and the outer wing projecting to a position at or above the inner wing, the inner wing being configured for shifting an occupant's adjacent arm forward and the outer wing is configured for protecting the thorax, wherein in the inflated state a fold in a wall of the side airbag extends downward from the upper end to an unsecured end within an interior of the side airbag to define an indentation separating at least portions of the inner and outer wings from one another.

16. The thorax occupant protection device according to claim 15, wherein portions of the wall defining the fold engage one another along the indentation when the side airbag is in the inflated state.

* * * * *

UNITED STATES PATENT AND TRADEMARK OFFICE
CERTIFICATE OF CORRECTION

PATENT NO. : 10,173,631 B2  
APPLICATION NO. : 15/117751  
DATED : January 8, 2019  
INVENTOR(S) : Azucena Perez Garcia et al.

Page 1 of 1

It is certified that error appears in the above-identified patent and that said Letters Patent is hereby corrected as shown below:

In the Claims

Column 6, Line 37 reads "wing" should read --wings--

Column 6, Line 62 reads "wind" should read --wing--

Column 7, Line 20 reads "outer" should read --outer wing--

Column 8, Line 6 reads "inner" should read --outer--

Signed and Sealed this
Second Day of April, 2019

Andrei Iancu
*Director of the United States Patent and Trademark Office*